United States Patent
Gebauer (12)

(10) Patent No.: US 6,351,746 B1
(45) Date of Patent: Feb. 26, 2002

(54) COOL ICE ICONS

(75) Inventor: Niels Gebauer, New South Wales (AU)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/188,840

(22) Filed: Nov. 9, 1998

(51) Int. Cl.⁷ .............................................. G06F 17/30
(52) U.S. Cl. .................... 707/10; 709/203; 345/700; 345/760; 345/762; 345/763; 345/764
(58) Field of Search ............................ 707/10, 1, 4, 100, 707/102, 104.1, 103 Y, 103; 345/349, 358, 700, 760, 762, 763, 764; 709/201, 202, 220

(56) References Cited

U.S. PATENT DOCUMENTS

| | | | | |
|---|---|---|---|---|
| 5,428,776 A | * | 6/1995 | Rothfield | ..................... 395/600 |
| RE36,444 E | * | 12/1999 | Sanchez-Frank et al. | ... 345/349 |
| 6,009,410 A | * | 12/1999 | LeMole et al. | ................ 705/14 |
| 6,018,346 A | * | 1/2000 | Moran et al. | ................ 345/358 |
| 6,072,491 A | * | 6/2000 | Yohanan | ...................... 345/349 |

OTHER PUBLICATIONS

Unisys Corporation, "Cool ICE", Users Guide Release 1.0 (intranet/internet secure access.com), Mar. 1997.*
Classic MAPPER® User's Guide, Unisys Corporation, Copyright 1994, Release Levels 5R1/37R1/1.0 (entire volume).
Cool ICE® Users Guide Release 1.0, Unisys Corporation, Copyright Mar. 1997 (entire volume).

\* cited by examiner

*Primary Examiner*—Jack Choules
*Assistant Examiner*—Cheryl Lewis
(74) *Attorney, Agent, or Firm*—Charles A. Johnson; Mark T. Starr; Nawrocki, Rooney & Sivertson, P.A.

(57) ABSTRACT

An apparatus for and method of utilizing an internet terminal coupled to the world wide web to access an existing proprietary data base management system. The internet terminal is capable of accessing an object of the data base management system by manual actuation of an icon. After the access is complete, data is returned to the internet terminal. Actuation of the icon can also schedule an application within the internet terminal corresponding to the object, such that data from the object is provided to the application for further processing. The application may generate a request for one or more subsequent object accesses to make the process iterative.

4 Claims, 10 Drawing Sheets

COOL ICE ICONS

CROSS REFERENCE TO CO-PENDING APPLICATIONS

U.S. patent application Ser. No. 09/164,759, filed Oct. 1, 1998, and entitled, "A Common Gateway Which Allows Applets to Make Program Calls to OLTP Applications Executing on an Enterprise Server pending". U.S. patent application Ser. No. 09/164,932, filed Oct. 1, 1998 and entitled, "A Multi-Client User Customized DOM Gateway for an OLTP Enterprise Server Application pending"; U.S. patent application Ser. No. 09/164,908 filed Oct. 1, 1998 and entitled, "An Automated Development System for Developing Applications that Interface with Both Distributed Component Object Model (DOM) and Enterprise Server Environments pending"; U.S. patent application Ser. No. 09/164,933, filed Oct. 1, 1998 and entitled, "Providing a Modular Gateway Architecture Which Isolates Attributes of the Client and Server Systems into Independent Components, U.S. Pat. No. 6,212,546"; U.S. patent application Ser. No. 09/164,822, filed Oct. 1, 1998 and entitled, "Making CGI Variables and Cookie Information Available to an OLTP System pending"; U.S. patent application Ser. No. 09/164,673, filed Oct. 1, 1998 and entitled, "A Gateway for Dynamically Providing Web Site Status Information pending"; U.S. patent application Ser. No. 09/164,756, filed Oct. 1, 1998 and entitled, "Development System for Automatically Enabling a Server Application to Execute with an XATMI-complaint transaction MGR: Managing Transactions within Multiple Environments U.S. Pat. No. 6,272,675"; U.S. patent application Ser. No. 09/189,053, filed Nov. 9, 1998 and entitled, "Cool ICE Batch Interface pending"; U.S. patent application Ser. No. 09/189,381, filed Nov. 9, 1998 and entitled, "Cool ICE Debug pending"; U.S. patent application Ser. No. 09/188,628, filed Nov. 9,1998 and entitled, "Cool ICE Workstation Directory/File Browser pending"; U.S. patent application Ser. No. 09/188,725, filed Nov. 9, 1998 and entitled, "Cool ICE State Management pending"; entitled, "Cool ICE Service Templates"; U.S. patent application Ser. No. 09/188,383, filed Nov. 9, 1998, and entitled, "Automatic Footer Text on HTML Pages"; U.S. patent application Ser. No. 09/189,383 filed Nov. 9, 1998 and entitled, "Availability Message"; U.S. patent application Ser. No. 09/189,611 filed Nov. 9, 1998 pending and entitled, "Cool ICE System Settings"; U.S. patent application Ser. No. 09/188,807, filed Nov. 9, 1998 and entitled, "Cool ICE Service Handler"; U.S. patent application Ser. No. 09/189,616 filed Nov. 9, 1998 pending and entitled, "Server Side Variables"; U.S. patent application Ser. No. 09/188,629 filed Nov. 9, 1998 pending and entitled, "Cool ICE Data Wizard"; U.S. patent application Ser. No. 09/188,649 filed Nov. 9, 1998 U.S. Pat. No. 6,245,531 and entitled, "Cool ICE Column Profiling"; U.S. patent application Ser. No. 09/189,365 filed Nov. 9, 1998 pending and entitled, "Cool ICE Table Profiling"; and U.S. patent application Ser. No. 09/189,160 filed Nov. 9, 1998 pending and entitled, "Cool ICE Database Profiling" are commonly assigned co-pending applications incorporated herein by reference.

BACKGROUND OF THE INVENTION

1. Field of the Invention

The present invention generally relates to data base management systems and more particularly relates to enhancements for providing access to data base management systems via internet user terminals.

2. Description of the prior art

Data base management systems are well known in the data processing art. Such commercial systems have been in general use for more than 20 years. One of the most successful data base management systems is available from Unisys Corporation and is called the Classic MAPPER® data base management system. The Classic MAPPER system can be reviewed using the Classic MAPPER User's Guide which may be obtained from Unisys Corporation.

The Classic MAPPER system, which runs on proprietary hardware also available from Unisys Corporation, provides a way for clients to partition data bases into structures called filing cabinets and drawers, as a way to offer a more tangible format. The Mapper data base manager utilizes various predefined high-level instructions whereby the data base user may manipulate the data base to generate human-readable data presentations called "reports". The user is permitted to prepare lists of the various predefined high-level instructions into data base manager programs called "Mapper Runs". Thus, users of the Classic MAPPER system may create, modify, and add to a given data base and also generate periodic and aperiodic reports using various Mapper Runs.

However, with the Classic MAPPER system, as well as with similar proprietary data base management systems, the user must interface with the data base using a terminal coupled directly to the proprietary system and must access and manipulate the data using the Mapper Run command language of Classic MAPPER. Ordinarily, that means that the user must either be co-located with the hardware which hosts the data base management system or must be coupled to that hardware through dedicated telephone, satellite, or other data links. Furthermore, the user usually needs to be schooled in the command language of Classic MAPPER (or other proprietary data base management system) to be capable of generating Mapper Runs.

Since the advent of large scale, dedicated, proprietary data base management systems, the internet or world wide web has come into being. Unlike closed proprietary data base management systems, the internet has become a world wide bulletin board, permitting all to achieve nearly equal access using a wide variety of hardware, software, and communication protocols. Even though some standardization has developed, one of the important characteristics of the world wide web is its ability to constantly accept new and emerging techniques within a global framework. Many current users of the internet have utilized several generations of hardware and software from a wide variety of suppliers from all over the world. It is not uncommon for current day young children to have ready access to the world wide web and to have substantial experience in data access using the internet.

Thus, the major advantage of the internet is its universality. Nearly anyone, anywhere can become a user. That means that virtually all persons are potentially internet users without the need for specialized training and/or proprietary hardware and software. One can readily see that providing access to a proprietary data base management system, such as Classic MAPPER, through the internet would yield an extremely inexpensive and universally available means for accessing the data which it contains and such access would be without the need for considerable specialized training.

There are several basic problems with permitting internet access to a proprietary data base. The first is a matter of security. Because the internet is basically a means to publish information, reat care must be taken to avoid intentional or inadvertent access to certain data by unauthorized internet users. In practice this is substantially complicated by the need to provide various levels of authorization to internet users to take full advantage of the technique. For example, one might have a first level involving no special security features available to any internet user. A second level might be for specific customers, whereas a third level might be authorized only for employees. One or more fourth levels of security might be available for officers or others having specialized data access needs.

Existing data base managers have security systems, of course. However, because of the physical security with a proprietary system, a certain degree of security is inherent in the limited access. On the other hand, access via the internet is virtually unlimited which makes the security issue much more acute.

A second major problem is imposed by the internet protocol itself. One of the characteristics of the internet which makes it so universal is that any single transaction in HTML language combines a single transfer (or request) from a user coupled with a single response from the internet server. In general, there is no means for linking multiple transfers (or requests) and multiple responses. In this manner, the internet utilizes a transaction model which may be referred to as "stateless". This limitation ensures that the internet, its users, and its servers remain sufficiently independent during operation that no one entity or group of entities can unduly delay or "hang-up" the communications system or any of its major components. Each transmission results in a termination of the transaction. Thus, there is no general purpose means to link data from one internet transaction to another, even though in certain specialized applications limited amounts of data may be coupled using "cookies" or via attaching data to a specific HTML screen.

However, some of the most powerful data base management functions or services of necessity rely on coupling data from one transaction to another in dialog fashion. In fact this linking is of the essence of Mapper Runs which assume change of state from one command language statement to the next. True statelessness from a first Mapper command to the next or subsequent Mapper command would preclude much of the power of Classic MAPPER (or any other modern data base management system) as a data base management tool and would eliminate data base management as we now know it.

A third major problem, and that which is perhaps the most difficult conceptually, is that current internet usage tends to view the internet terminal as simply a "dumb" terminal for requesting data and displaying search results. So prevalent is this notion, that many internet users today interface with specialized hardware devices and television sets rather than more general purpose, stored program digital computers. Even those users accessing the internet via quite powerful, personalized computers ordinarily make no particular use of their considerable processing capabilities during internet access other than to request searches, display results, and occasionally print selected excerpts. Thus, the internet terminal is used only as an input/output device and not a processing partner of the server to which it is functionally coupled. There are simply processing tasks which would be better accomplished by the internet terminal or the internet terminal in cooperation with the server rather than just the server.

However, it is not an easy matter to parse a processing task for execution on the combination of an internet terminal and a server. The protocol of the world wide web and the nature of the data transfers is not particularly well suited to this architecture.

SUMMARY OF THE INVENTION

The present invention overcomes the disadvantages of the prior art by providing a method of and apparatus for effectively sharing certain processing tasks between an internet terminal and a full featured data base management system coupled to the world wide web or internet. In order to permit any such cooperation, the present invention must first provide a user interface, called a gateway, which translates transaction data transferred from the user over the internet in HTML format into a format from which data base management system commands and inputs may be generated. The gateway must also convert the data base management system responses and outputs into an HTML document for display on the user's internet terminal. Thus, as a minimum, the gateway must make these format and protocol conversions. In the preferred embodiment, the gateway resides in the web server coupled to the user via the world wide web and coupled to proprietary data base management system.

To make access to a proprietary data base by internet users practical, a sophisticated security system is required to prevent intentional or inadvertent unauthorized accesses. As discussed above, such a security system should provide multiple levels of access to accommodate a variety of authorized user categories. In the preferred embodiment of the present invention, several levels of data classification are provided and several classes of users are defined. This permits certain levels of data to be accessed by one or more of the several classes of user. The security system may either reside in the web server containing the gateway or may be an existing component of the data base management system.

Whereas the gateway and the security system are the minimum necessary to permit the most rudimentary form of communication between the internet terminal of the user and the proprietary data base management system, as explained above, the internet is a "stateless" communication system; the addition of the gateway and the security system do not change this statelessness. To unleash the real power of the data base management system, the communication protocol between the data base and the user requires functional interaction between the various data transfers.

The present invention adds state management to this environment. Instead of considering each transfer from the internet user coupled with the corresponding server response as an isolated transaction event as defined by the world wide web, one or more related service requests may be functionally associated in a service request sequence as defined by the data base management system into a dialog.

A repository is established to store the state of the service request sequence. As such, the repository can store intermediate requests and responses, as well as other data associated with the service request sequence. Thus, the repository buffers commands, data, and intermediate products utilized in formatting subsequent data base management service requests and in formatting subsequent HTML pages to be displayed to the user.

The transaction data in HTML format received by the server from the user, along with the state information stored in the repository, are processed by a service handler into a sequence of service requests in the command language of the data base management system. Sequencing and control of the data base management system is via an administration module.

Through the use of the repository to store the state of the service request sequence, the service handler to generate data base management command language, and the administration module, the world wide web user is capable of performing each and every data base management function available to any user, including a user from a proprietary terminal having a dedicated communication link which is co-located with the proprietary data base management system hardware and software. In addition, the data base management system user at the world wide web terminal is able to accomplish this in the HTML protocol, without extensive training concerning the command language of the data base management system.

To greatly enhance user-friendly access to the data base management system, the preferred embodiment of the present invention provides icons which appear to the user at the internet terminal. An icon is utilized to uniquely identify an object or group of objects within the data base management system. Therefore, the object(s) identified is not resident on the computer displaying the icon, but rather is resident at a server which is accessible only using the world wide web.

The object may define a data set, a data base management system command set, or a combination. "Clicking" on the icon generates an HTML transmission to the server for translation by the gateway into a call to the corresponding data base management system object. If the icon represents an object which is a data set only, the data is retrieved and transferred via the world wide web to the internet terminal for further use by the internet user. If the icon represents a command set or a combination involving a command set, the necessary data is accessed and the command set is executed. The resulting data set is then transferred to the internet terminal via the world wide web.

The icon may also be used to link the data set received from the data base management system via the world wide web to an application resident within the internet terminal. It is this linking which permits the parsing of the data processing activity between the data base management system and the internet terminal. The application thus linked may in turn generate another HTML transmission requesting additional data, additional data base management processing, or both. Similarly, the response to any HTML transmission may trigger yet further application processing within the internet terminal. In this manner, a clicking on a single icon at the internet terminal may create a sequence of events involving data access and processing at either end of the world wide web digital communication link.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The present invention is described in accordance with several preferred embodiments which are to be viewed as illustrative without being limiting. These several preferred embodiments are based upon Series 2200 hardware and operating systems, the Classic MAPPER data base management system, and the Cool ICE software components, all available from Unisys Corporation.

Figure 1:
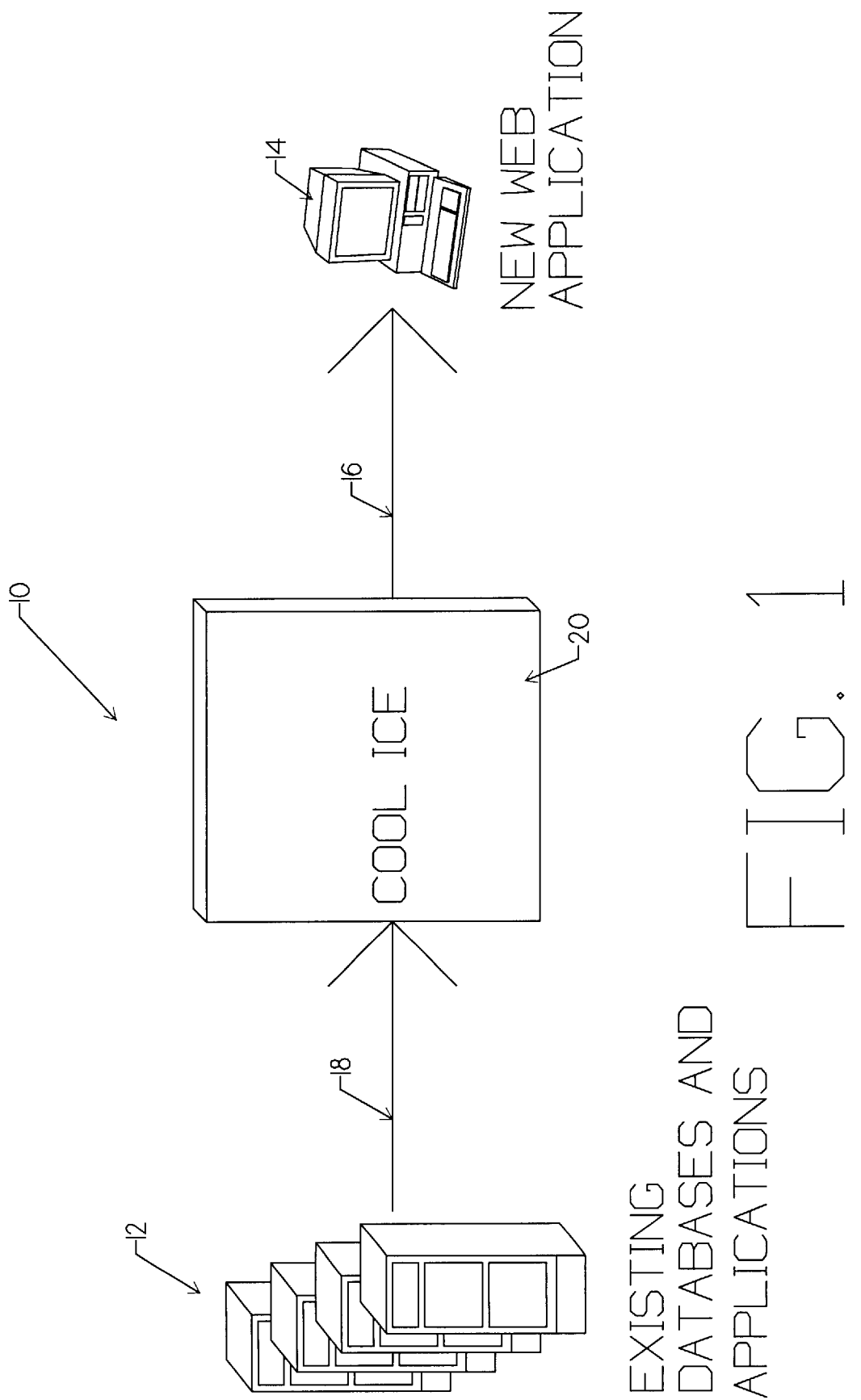
FIG. 1 is pictographic view of the Cool ICE system coupled between a user on the world wide web and an existing proprietary data base management system.

FIG. 1 is an overall pictographic representation of a system 10 permitting access to a proprietary data base management system via an internet terminal. Existing data bases and applications 12 represents commercially available hardware and software systems which typically provide select users with access to proprietary data and data base management functions. In the preferred embodiment, existing data bases and applications 12 represents Series 2200 hardware and operating system containing one or more data bases prepared using Classic MAPPER data base management system, all available from Unisys Corporation. Historically, existing data bases and applications 12 could only be accessed from a dedicated, direct terminal link, either physically co-located with the other system elements or connected thereto via a secured dedicated telephonic, satellite, or fiber optic link.

With the preferred mode of the present invention, communication between new web application terminal 14 and existing data bases and applications 12 is facilitated. As discussed above, this permits nearly universal access by users world wide without specialized hardware and/or user training. The user effects the access using standardized HTML transaction language through world wide web link 16 to the Cool ICE system 20, which serves as a world wide web server to world wide web link 16.

Cool ICE system 20 appears to existing data bases and applications 12 as a data base management system proprietary user terminal over dedicated link 18. Oftentimes, dedicated link 18 is an intranet or other localized network link. Cool ICE system 20 is currently available in commercial form without the present invention as Cool ICE Revision Level 1.1 from Unisys Corporation.

Figure 2:
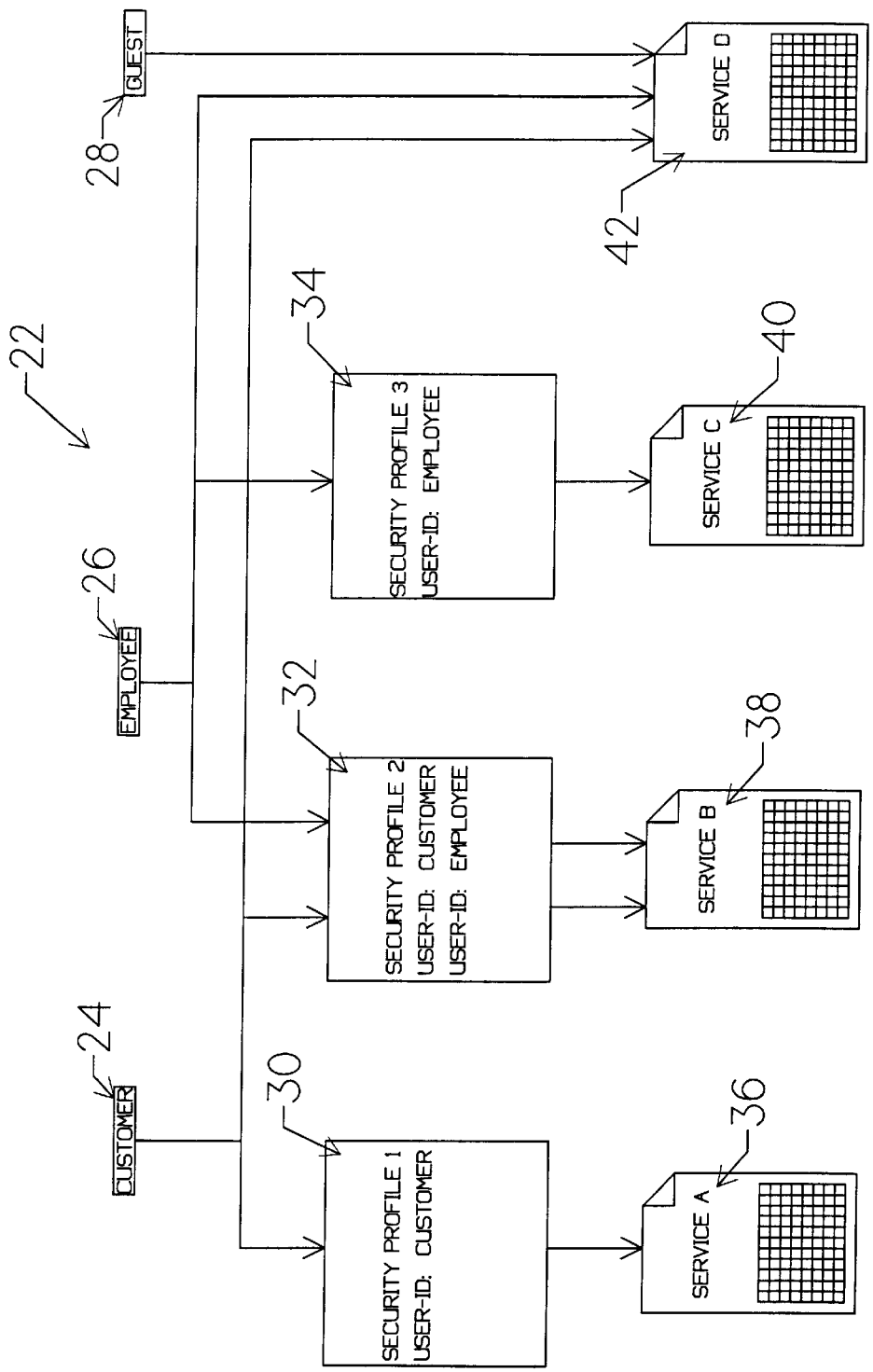
FIG. 2 is a schematic drawing showing the operation of a multi-level security system in accordance with the preferred embodiment of the present invention.

FIG. 2 is a schematic diagram of security system 22 of the preferred mode of the present invention. By way of example, there are four categories of service defined, each with its own functionality and portion of the data base. Service A 36 contains data and functions which should only be made available to customers. Service B 38 contains data and functions which should only be made available to customers or employees. Service C 40 contains data and functions which should only be made available to employees, and Service D 42, containing the least restrictive data and functions may be made available to anyone, including the general public.

In a typical application, Service D 42 might contain the general home page information of the enterprise. It will consist of only the most public of information. It is likely to include the name, address, e-mail address, and phone number of the enterprise, along with the most public of the business details. Usually, Service D 42 would include means of presenting the information in a sufficiently interesting way to entice the most casual of the public user to make further inquiry and thus become more involved with the objectives of the enterprise. Service D 42 represents the lowest level of security with data and functions available to all.

Service C 40 is potentially the highest level of classification. It contains data and functions which can be made available only to employees. In actual practice, this might entail a number of sub levels corresponding to the various levels of authority of the various employees. However, some services may be so sensitive that the enterprise decides not to provide any access via the internet. This might include such things as strategic planning data and tools, advanced financial predictions, specific information regarding individual employees, marketing plans, etc. The penalty for this extreme security measure is that even authorized individuals are prohibited from accessing these services via the internet, and they must take the trouble to achieve access via an old-fashioned dedicated link.

Customers and employees may share access to Service B 38. Nevertheless, these data and functions are sufficiently sensitive that they are not made public. Service B 38 likely provides access to product specifications, delivery schedules and quantities, and pricing.

For customer access only is Service A 36. One would expect marketing information, along with specific account information, to be available here.

These four service levels (i.e., Service A 36, Service B 38, Service C 40, and Service D 42) are regulated in accordance with three security profiles. The lowest level of security does not require a security profile, because any member of the general public may be granted access. This can be readily seen as guest category 28 (e.g., a member of the public) can directly access Service D 42. Of course, all other categories of user may also directly access Service D 42, because all members of the more restrictive categories (e.g., customers and employees) are also members of the general public (i.e., the least restrictive category).

Security Profile #1, 30 permits access to Service A 36 if and only if the requestor seeking access is a customer and therefore a member of customer category 24. Members of customer category 24 need to identify themselves with a customer identification code in order to gain access. The assigning and processing of such identification codes are well known to those of skill in the art.

Similarly, Security Profile #3, 34 permits access to Service C 40 if and only if the requestor seeking access is an employee and therefore a member of employee category 26. Security Profile #2, 32 permits access to Service B 38 to requesters from either customer category 24 or employee category 26, upon receipt of a customer identification code or an employee identification code.

Figure 3:
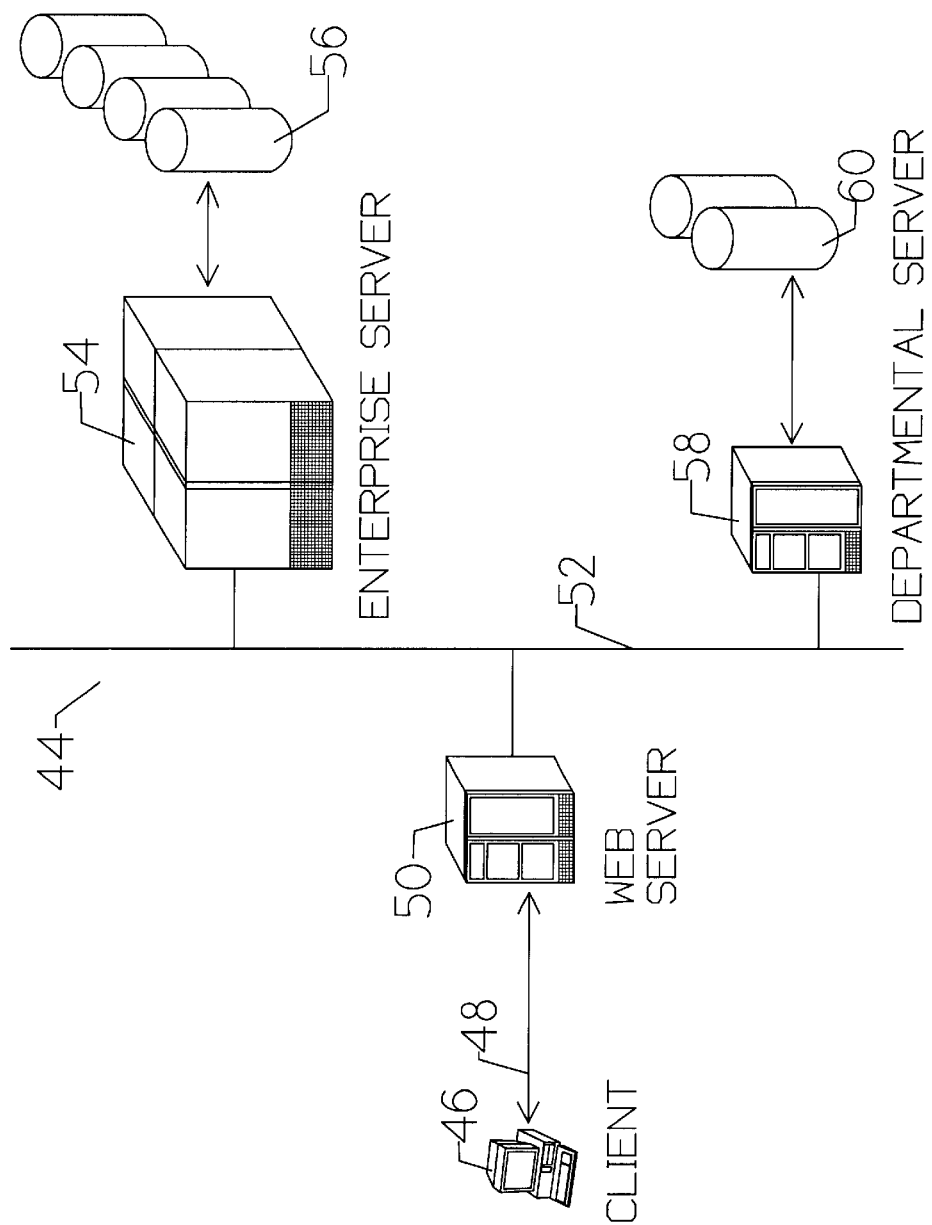
FIG. 3 is a pictographic view of the hardware of the preferred embodiment.

FIG. 3 is a pictorial diagram of hardware suite 44 of the preferred embodiment of the present invention. The client interfaces with the system via internet terminal 46. Preferably, internet terminal 46 is an industry compatible, personalized computer having a current version of the Windows operating system and suitable web browser, all being readily available commercial products. Internet terminal 46 communicates over world wide web access 48 using standardized HTML protocol.

The Cool ICE system is resident in web server 50, which is coupled to internet terminal 46 via world wide web access 48. In the preferred mode, web server 50 is owned and operated by the enterprise owning and controlling the proprietary data base management system. Web server 50 may serve as the internet access provider for internet terminal 46 wherein world wide web access 48 is typically a dial-up telephone line. This would ordinarily be the case if the shown client were an employee of the enterprise. On the other hand, web server 50 may be a remote server site on the internet if the shown client has a different internet access provider. This would ordinarily occur if the shown client were a customer or guest.

In addition to being coupled to world wide web access 48, web server 50, containing the Cool ICE system, is coupled to intranet 52 of the enterprise as shown. Intranet 52 provides the enterprise with communication for its internal business purposes. This communication is administered and managed by enterprise server 54 having enterprise server storage facility 56. Thus, employees and others granted access may communicate via intranet 52 within the physical security provided by the enterprise.

Also coupled to intranet 52 is departmental server 58 having departmental server storage facility 60. Additional departmental servers (not shown) may be coupled to intranet 52. The enterprise data and enterprise data base management service functionality typically resides within enterprise server 54, departmental server 58, and any other departmental servers (not shown). Normal operation in accordance with the prior art would provide access to this data and data base management functionality via intranet 52 to users directly coupled to intranet 52.

In the preferred mode of the present invention, access to this data and data base management functionality is also provided to users (e.g., internet terminal 46) not directly coupled to intranet 52, but indirectly coupled to intranet 52 via web server 50. As explained below in more detail, web server 50 provides this access utilizing the Cool ICE system resident in web server 50.

Figure 4:
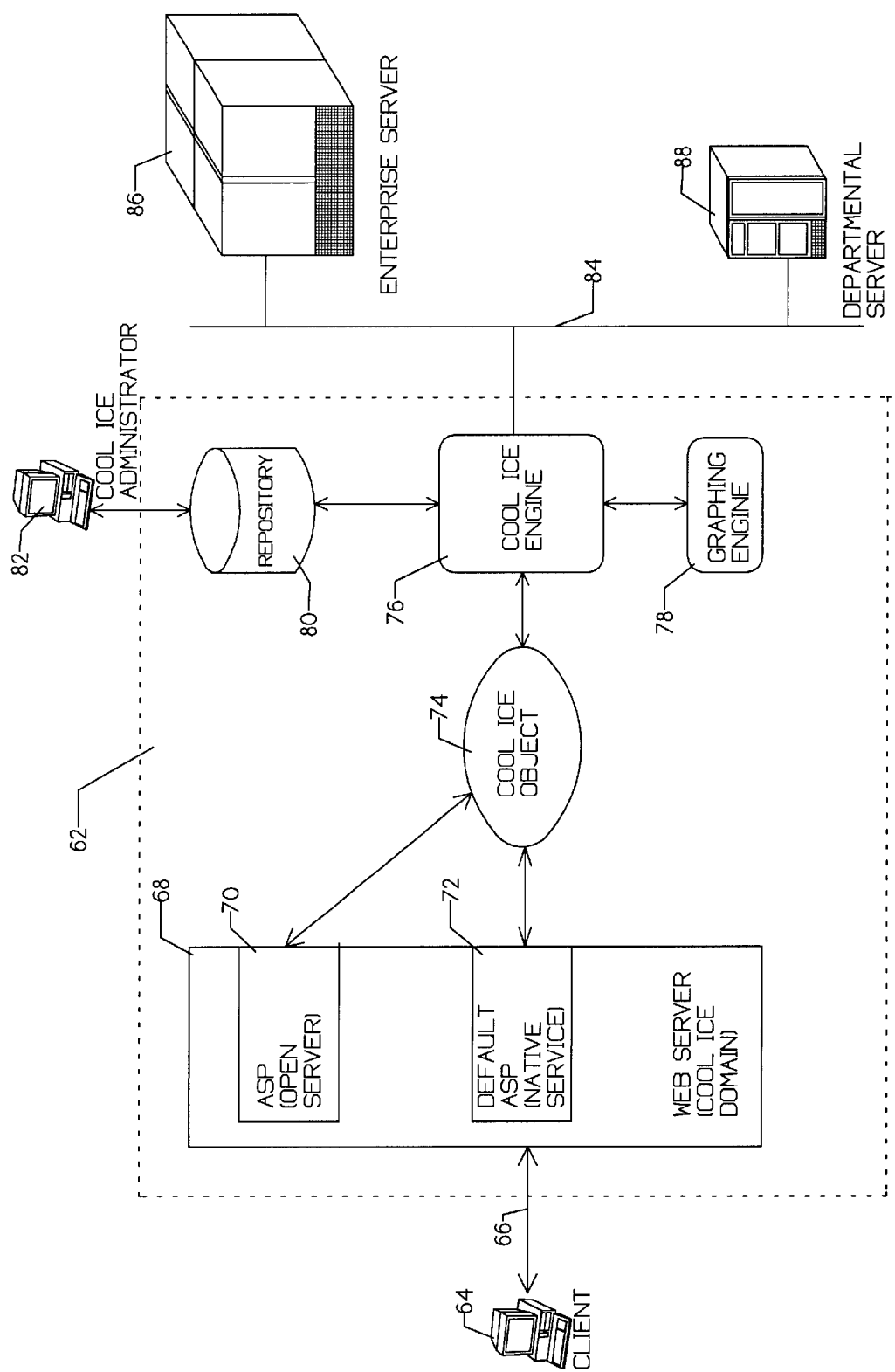
FIG. 4 is a semi-schematic diagram of the operation of the Cool ICE system.

FIG. 4 is pictographic view of the system of FIG. 3 with particular detail showing the organization and operation of the Cool ICE system 62, which is resident in the web server (see also FIG. 3). In this view, the client accesses the data base management system within the enterprise via internet terminal 54 which is coupled to the web server 68 by world wide web path 66. Again, the internet terminal 54 is preferably an industry standard computer utilizing a commercially available web browser.

The basic request/response format of the Cool ICE system involves a "service" (defined in greater detail below) which is an object of the Cool ICE system. The service is a predefined operation or related sequence of operations which provide the client with a desired static or dynamic result. The services are categorized by the language in which they were developed. Whereas all services are developed with client-side scripting which is compatible with internet terminal 54 (e.g., HTML), the server-side scripting defines the service category. Native services utilize Cool ICE script for all server-side scripting. On the other hand, open services may have server-side scripting in a variety of common commercial languages including Jscript, VBScript, ActiveX controls, and HTML. Because native services are developed in the Cool ICE language, greater development flexibility and variety are available with this technique.

Web server 68 provides open server processor 70 for Active Server Pages (ASP's) which have been developed as open services and Default ASP processor 72 for native services. After the appropriate decoding (i.e., native or open service), a call to the corresponding Cool ICE object 74 is initiated as shown. The selected object is processed by Cool ICE engine 76.

Repository 80 is a storage resource for long term storage of the Cool ICE objects and short term storage of the state of a particular service. Further details concerning repository 80 may be found by consulting the above referenced, commonly-assigned, co-pending U.S. Patent Application. In the preferred mode of the present invention, the objects stored in repository 80 are typically very similar to mapper runs as described above. For a more detailed description of mapper runs, Classic MAPPER User Manual is available from Unisys Corporation and incorporated herein by reference. In the more general case, repository 80 would typically store predefined sequences of statements in the command language of the enterprise data base management system(s) to be accessed.

Cool ICE engine 76 sequences these previously stored command statements and uses them to communicate via intranet 84 with the data base management system(s) (e.g., Classic Mapper) resident on enterprise server 86 and departmental server 88. The short term storage capability of repository 80 is utilized by Cool ICE engine 76 to store the state and intermediate products of each service until the processing sequence has been completed. Following completion, Cool ICE engine 76 retrieves the intermediate products from repository 80 and formats the output response to the client, which is transferred to internet terminal 54 via web server 68 and world wide web path 66.

Cool ICE Administrator 82 is available for coordination of the operation of Cool ICE system 62 and thus can resolve conflicts, set run-time priorities, deal with security issues, and serve as a developmental resource. Graphing engine 78 is available to efficiently provide graphical representations of data to be a part of the response of a service. This tends to be a particularly useful utility, because many of the existing data base management systems have relatively sparse resources for graphical presentation of data.

The combination of Cool ICE engine 76 and repository 80 permits a rather simplistic service request from internet terminal 54 in dialog format to initiate a rather complex series of data base management system functions. In doing so, Cool ICE engine 76 emulates an intranet user of the data base management system(s) resident on enterprise server 86 and/or departmental server 88. This emulation is only made possible, because repository 80 stores sequences of command language statements (i.e., the logic of the service request) and intermediate products (i.e., the state of the service request). It is these functions which are not available in ordinary dialog on the world wide web and are therefore not even defined in that environment.

Figure 5:
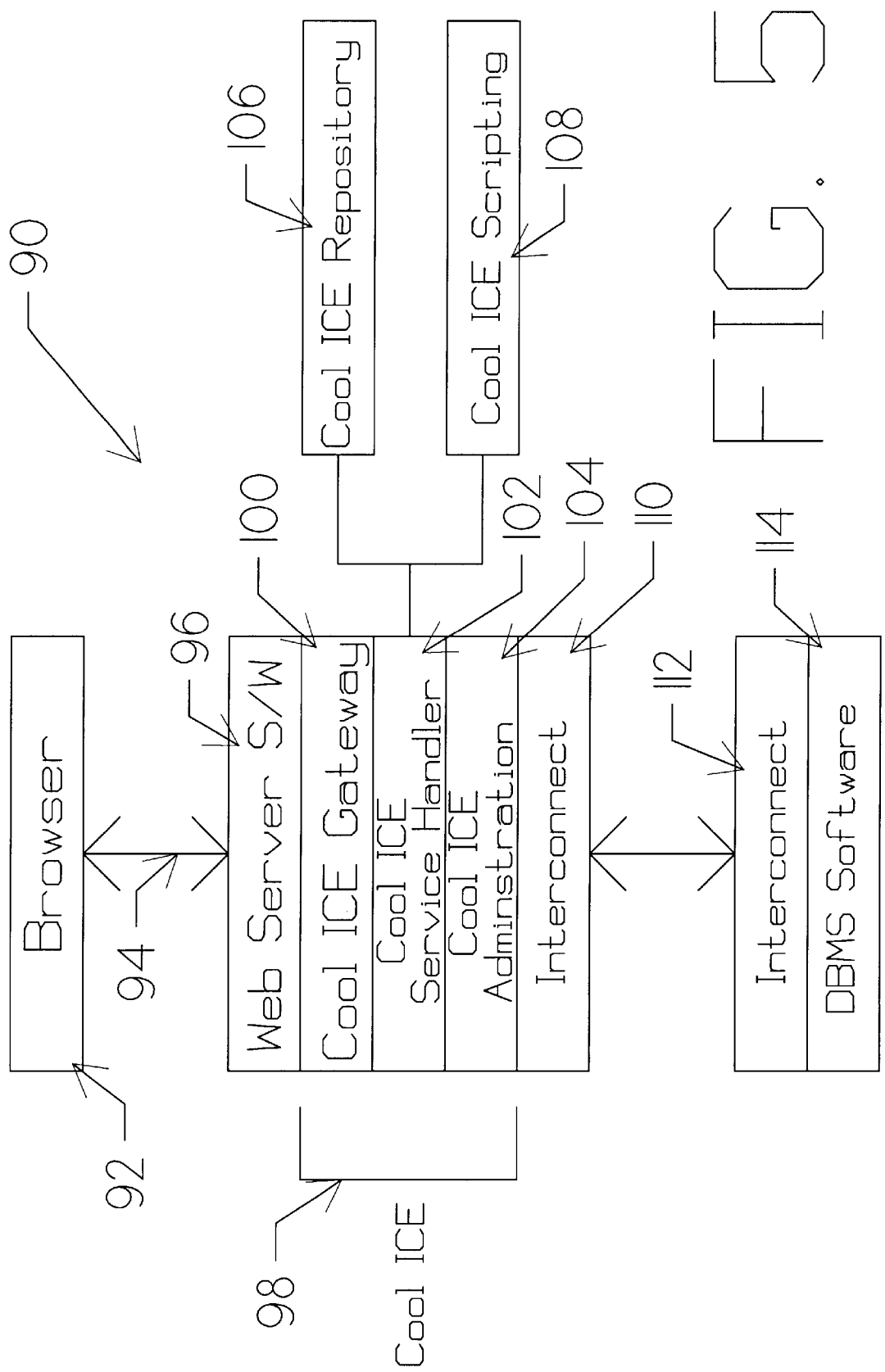
FIG. 5 is an overall schematic view of the software of the Cool ICE system.

FIG. 5 is a schematic diagram 90 of the software components of the Cool ICE system and the software components to which it interfaces in the preferred mode of the present invention. The client user of the Cool ICE system interfaces directly with web browser 92 which is resident on internet terminal 54 (see also FIG. 4). Web browser 92 is a commercially available browser operating under a current version of the Windows operating system (e.g., Windows 95). The only special requirement of web browser 92 is that it be capable of supporting frames.

Web browser 92 communicates with web server software 96 via internet standard protocol using HTML language using world wide web path 94. Web server software 96 is also commercially available software, which is, of course, appropriate for to the web server host hardware configuration. In the preferred mode of the present invention. web server software 96 is hosted on a Series 2200 mainframe available from Unisys Corporation, from which web server software 96 is readily available.

Cool ICE system software 98 consists of Cool ICE Gateway 100, Cool ICE service handler 102, Cool ICE administration 104, Cool ICE repository 106, and Cool ICE scripting 108. It is these five software modules which interface to web server software 96 in HTML using a dialog format and interface to data base management system interconnect 110 in the command language of the enterprise data base management system(s) (i.e., Classic MAPPER in the preferred mode of the present invention).

Cool ICE gateway 100 is the interface between standard, commercially available, web server software 96 and the internal Cool ICE system language and logic. As such, Cool ICE gateway 100 translates the dialog format, incoming HTML service request into internal Cool ICE language. and protocol. Intrinsic in this translation is a determination of the serve category (see also FIG. 4)—that is whether the service request is a native service (i.e., with Cool ICE server-side scripting) or an open service (i.e., with server-side scripting in another commercial language).

The service request, received from Cool ICE gateway 100, is utilized by Cool ICE service handler 102 to request the corresponding object from Cool ICE repository 106 and to open temporary state storage using Cool ICE repository 106. Cool ICE scripting 108 is called to translate the server-side scripting of an open service request as necessary. Cool ICE service handler 102 sequences through the command language statements of the object received from Cool ICE repository 106 and forwards each command in turn to data base management system software 114 for accessing of the enterprise proprietary data base management system. Cool ICE service handler 102 receives each of the intermediate products from data base management system software 114 and transfers each to Cool ICE repository 106 for temporary storage until completion of the service request. Cool ICE service handler 102 retrieves the intermediate products from Cool ICE repository 106 upon completion of the service request and formulates the Cool ICE response for transfer to browser 92 via web server software 96 and world wide web path 94.

Cool ICE administration 104 implements automatic and manual control of the process. It provides for record keeping, for resolution of certain security issues, and for development of further Cool ICE objects. Interconnect 110 and interconnect 112 are software interface modules for communicating over the enterprise intranet (see also FIG. 4). These modules are dependent upon the remaining proprietary hardware and software elements coupled to the enterprise intranet system. In the preferred mode of the present invention, these are commercially available from Unisys Corporation.

Figure 6:
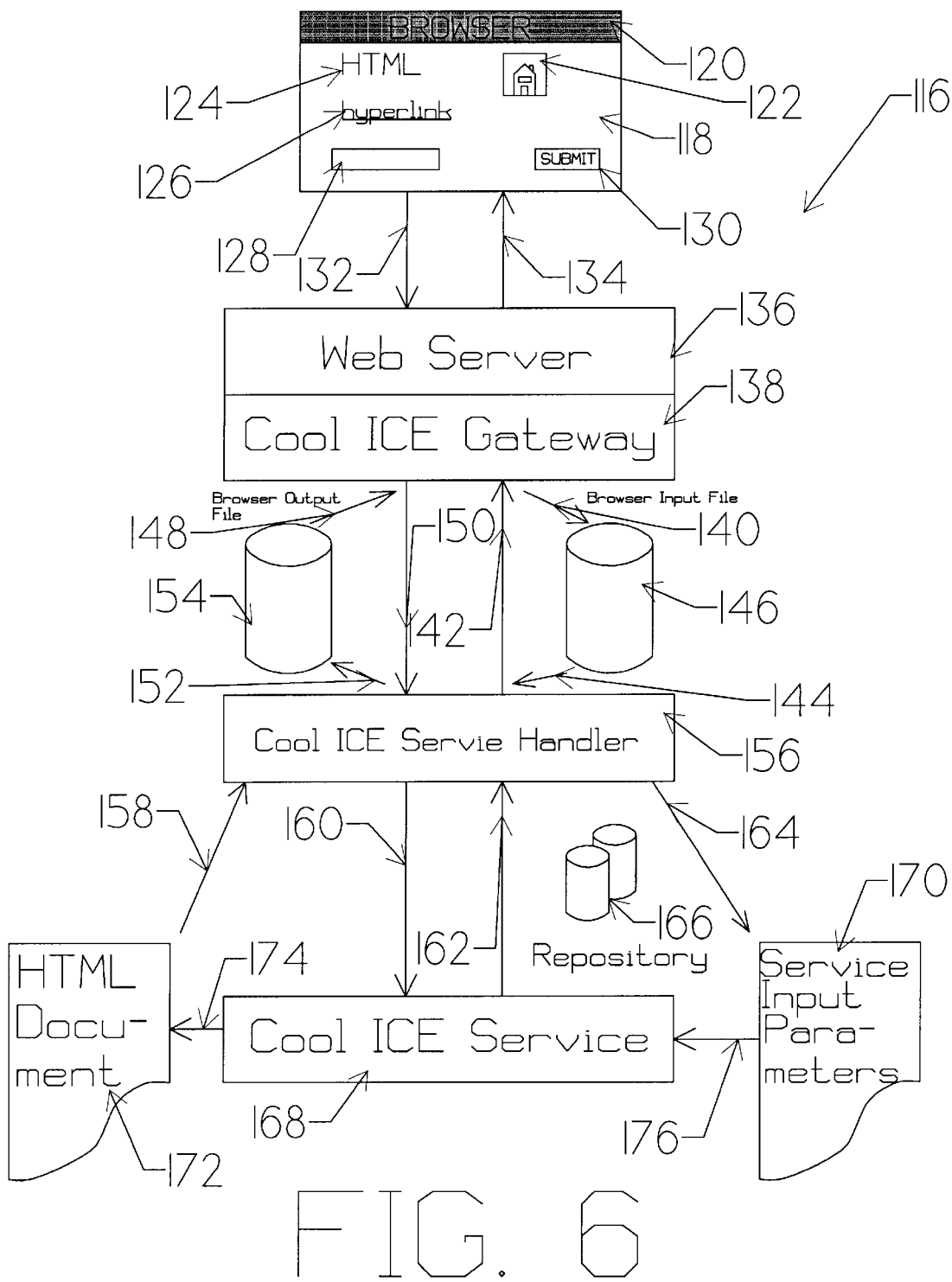
FIG. 6 is a schematic view of a service request.

FIG. 6 is a schematic diagram 116 showing the processing of a service request by the Cool ICE system. Screen 118 is the view as seen by the client or user at an internet terminal (see also FIG. 4). This screen is produced by the commercially available browser 120 selected by the user. Any such industry standard browser is suitable, if it has the capability to handle frames. The language of screen 118 is HTML 124. Hyperlinks 126 is used in locating the URL of the Cool ICE resident server. In many instances, this will simply be the internet access provider of the internet terminal, as when the internet terminal is owned by the enterprise and the user is an employee. However, when the user is not an employee and the internet terminal is not necessarily owned by the enterprise, it becomes more likely that hyperlinks 126 identifies a remotely located server.

Icon 122 is a means of expressly identifying an object defined within the Cool ICE system. This use of an icon is deemed to be unique, because it identifies an object which is not resident on the internet terminal. Rather. icon 122 identifies an object which is remotely locatable only over the world wide web. The power of this technique is greatly enhanced by the capability of linking one or more applications within the internet terminal to the Cool ICE object identified by the icon. Additional detail concerning this use of an icon is provided below.

Window area 128 provides for the entry of any necessary or helpful input parameters. Not shown are possible prompts for entry of this data, which may be defined at the time of service request development. Submit button provides the user with a convenient means to transmit the service request to the web server in which the Cool ICE system is resident.

Upon "clicking on" submit button 130, screen 118 is transmitted to web server 136 via world wide web path 132. As discussed above, world wide web path 132 may be a telephonic dial-up of web server 136 or it might be a long and complex path along the internet if web server 136 is remote from the originating internet terminal. Web server 136 is the software which performs the retrieval of screen 118 from world wide web path 132.

Screen 118 is transferred from web server 136 to Cool ICE gateway 138, wherein it is converted to the internal Cool ICE protocol and language. A browser input file is opened at storage resource 146 via path 140. Thus the initial service request can be accessed from storage resource 146 during processing up until the final result is transferred back to the user. This access readily permits multi-step and iterative service request processing, even though the service request was transferred as a single internet dialog element. This storage technique also provides initially received input parameters to later steps in the processing of the service request.

Cool ICE gateway 138 notifies Cool ICE service handler 156 that a service request has been received and logged in. The service request itself is utilized by Cool ICE service handler 156 to retrieve a previously stored sequence of data base management system command statements from repository 166. Thus, in the general case, a single service request will result in the execution of a number of ordered data base management system commands. The exact sequence of these commands is defined by the service request developer as explained in more detail below.

Service input parameters 170 is prepared from the service request itself and from the command sequence stored in repository 166 as shown by path 164. This list of input parameters is actually stored in a dedicated portion of repository 166 awaiting processing of the service request.

Each command statement from repository 166 identified with the service request is sequentially presented to Cool ICE service 168 for processing via path 160. The corresponding input parameter from service input parameters 170 is coupled with each command statement via path 176 to produce an appropriate query of the enterprise data base management system at Cool ICE service 168. After the enterprise data base management system has responded to a given query, the intermediate products are stored as entries in HTML document 172 which is also stored in a dedicated portion of repository 166.

After all command statements corresponding to the service request have been processed by the enterprise data base management system and HTML document 172 has been completed, the result is provided via path 156 to Cool ICE service handler 156 for temporary storage as a browser output file in storage resource 154 via path 152. Cool ICE gateway 138 receives the browser output file via path 148. The response is converted to HTML protocol and transferred by web server 136 and world wide web path 134 to be presented to the user as a modified screen (not shown).

Figure 7:
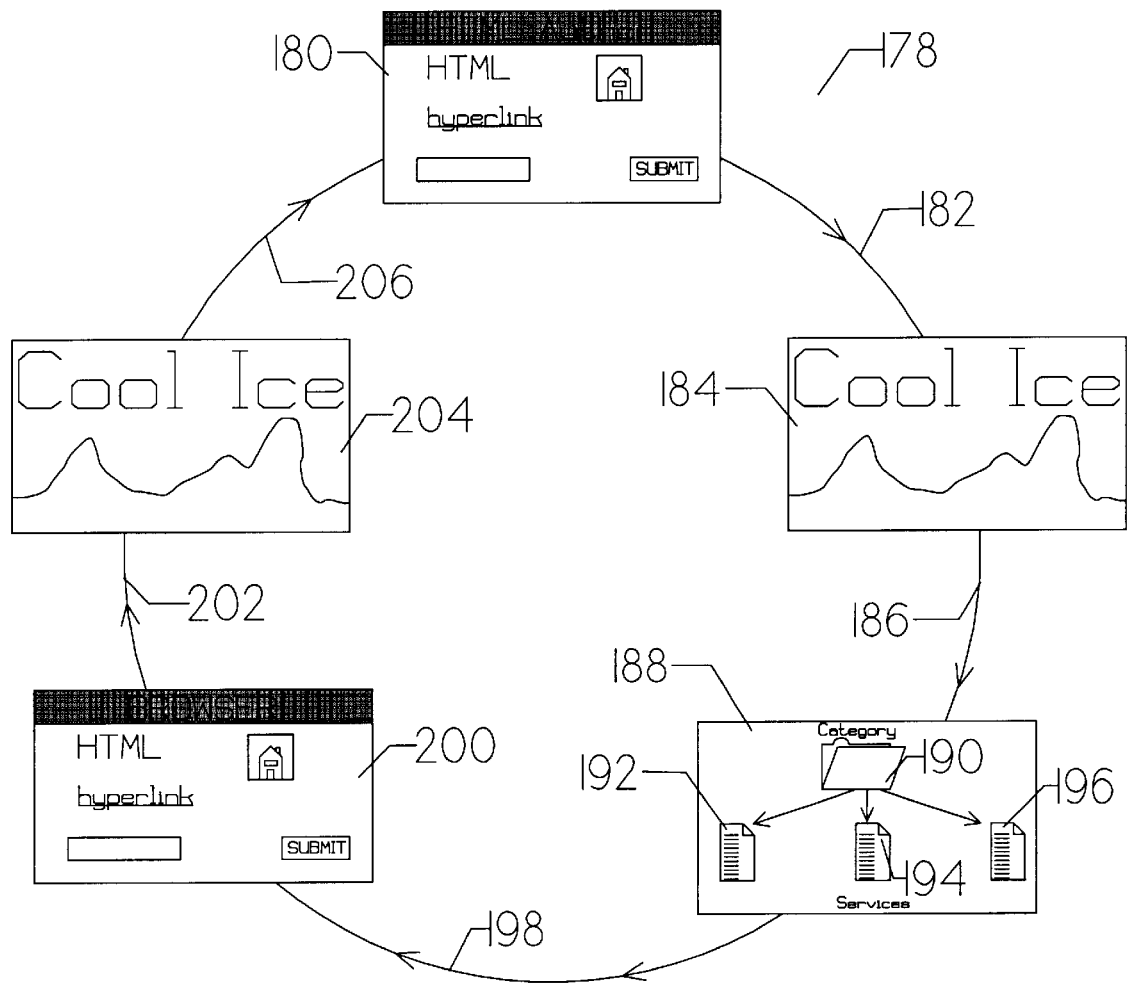
FIG. 7 shows a schematic view of a service request sequence.

FIG. 7 is a pictographic drawing 178 of the development process for creating a Cool ICE service. HTML document 180 is created utilizing any commercially available standard HTML authoring tool (e.g., Microsoft FrontPage). The resulting HTML document 180 is stored as a normal .HTM file. This file will be utilized as a template of the service to be developed.

The authoring process moves along path 182 to invoke the administration module of the Cool ICE system at element 184. The new dynamic service is created using HTML document 180 stored as a normal .HTM file as a template. As HTML document 180 is imported into Cool ICE, sequences of script for the beginning and end of the HTML code are automatically appended to the service. Required images, if any, are also uploaded onto the web server (see also FIGS. 5 and 6). The service is edited by inserting additional Cool ICE script, as required. A more detailed description of the editing process may be found in Cool ICE User's Guide, Revision 1.1, available from Unisys Corporation and incorporated herein by reference.

The completed service script is transferred along path 186 to element 188 for storage. The service is stored as an object in the repository (see also FIGS. 5 and 6). Storage is effected within the appropriate category 190 as discussed above, along with services 192, 194, and 196 within the same category.

The process proceeds along path 198 to element 200 for testing. To perform the testing, the URL for the newly created service is entered into the browser of the internet terminal, if known. The typical URL is as follows:

http://machine-name/ICEGate/Category/Service

If the URL for the new service is not known, a list of the available services may be determined from the Cool ICE system by specifying the Cool ICE URL as follows:

http:;//machine-name/ICEGate

This call will result in a presentation of a menu containing the defined categories. Selecting a category from the list will result in a menu for the services defined within that category. The desired service can thus be selected for testing. Selection of the service by either means will result in presentation of the HTML page as shown at element 200.

The process proceeds to element 204 via path 202, wherein the HTML page may be enhanced. This is accomplished by exporting the HTML document from the Cool ICE administration module to a directory for modification. By proceeding back to HTML document 180 via path 208. the exported HTML template is available for modification using a standard HTML authoring tool. After satisfactory completion, the finished HTML document is saved for future use.

Figure 8:
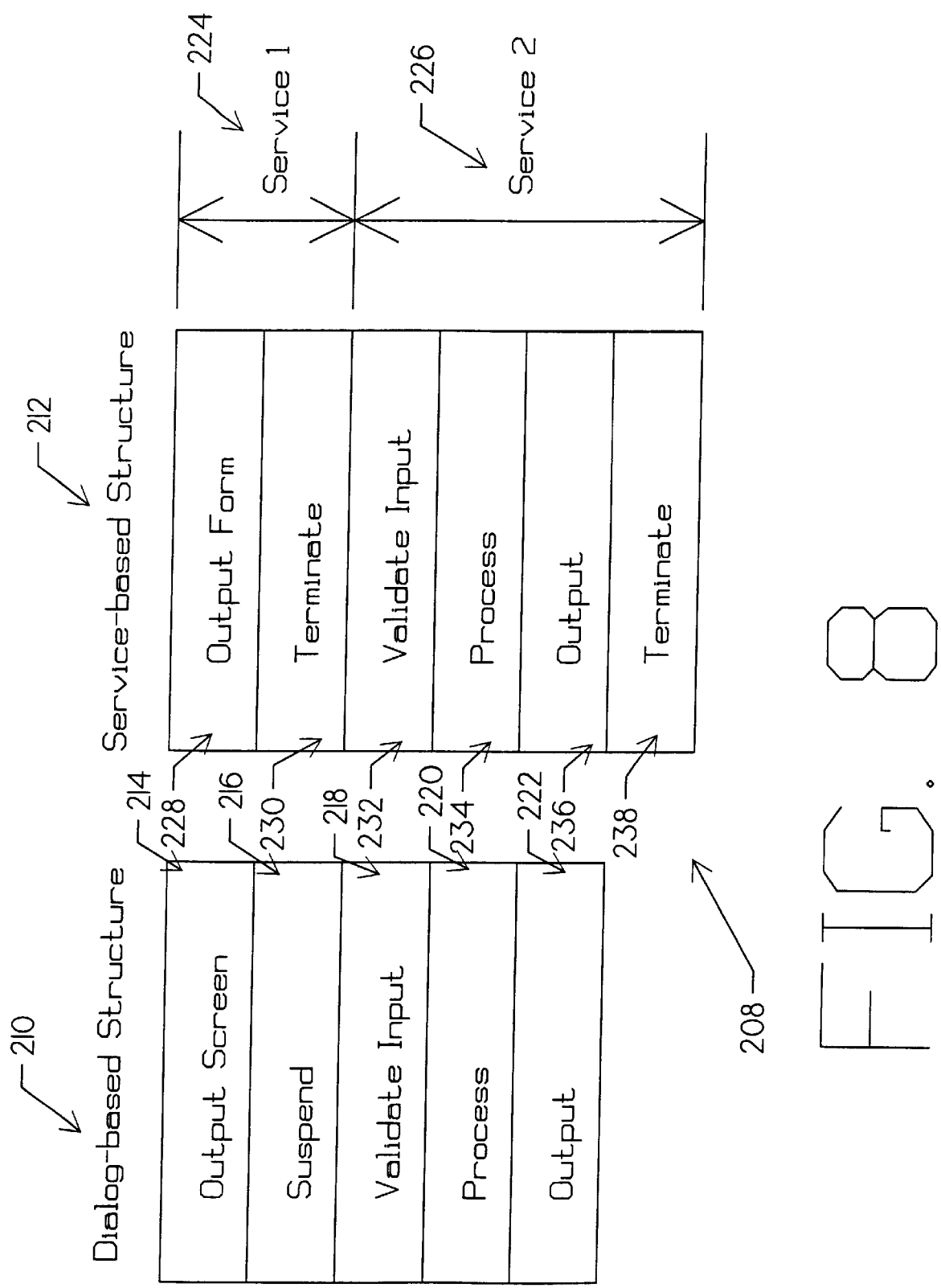
FIG. 8 is a diagrammatic comparison between a dialog-based structure and a service-based structure.

FIG. 8 is a diagram showing a comparison between dialog-based structure 210 and service-based structure 212. Dialog-based structure 210 is the norm for the typical existing proprietary data base management system (e.g., Classic MAPPER). The user, normally sitting at a dedicated user terminal, transfers output screen 214 to the data base management system to request a service. The user terminal and its normally dedicated link are suspended at element 216 to permit transfer and operation of the data base management system. The input is validated at element 218, while the user terminal and its normally dedicated link remains suspended.

The data base management system processes the service request at element 220 while the user terminal remains suspended. Output occurs at element 222 thereby releasing the suspension of the user terminal. Thus, a true dialog is effected, because one part of the dialog pair (i.e., the user terminal) is suspended awaiting response from the data base management system. This type of dialog is best accomplished in an environment wherein at least the user terminal (or data base management system) is dedicated to the dialog, along with the link between user terminal and data base management system.

Service-based structure 212 illustrates on of the basic constraints of the world wide web protocol. To ensure that each of the elements on the world wide web are sufficiently independent to prevent one element from unduly delaying or "hanging-up" another element to which it is coupled awaiting a response, the communication protocol forces a termination after each transmission. As can be readily seen, even the simplest dialog requires at least separate and independent transactions or services. The first service, Service 224, involves the transmissions of output form 228 from the internet user terminal. This transmission is immediately and automatically followed by termination 230 to ensure independence of the sender and receiver.

The second service, Service 226, enables the receiver of output form 228 to process the request and output an appropriate response. The validation of the input at element 232, processing 234, and output 236 all occur within the receiver of output form 228. Immediately and automatically, termination 238 follows. Thus, if internet transactions are to be linked into a true dialog to permit data base management functions, the state must be saved from one service to the next as taught herein.

In the preferred mode of the present invention, the state of a service is saved in the repository (see also FIGS. 4 and 5) for use in the next or subsequent services.

Figure 9:
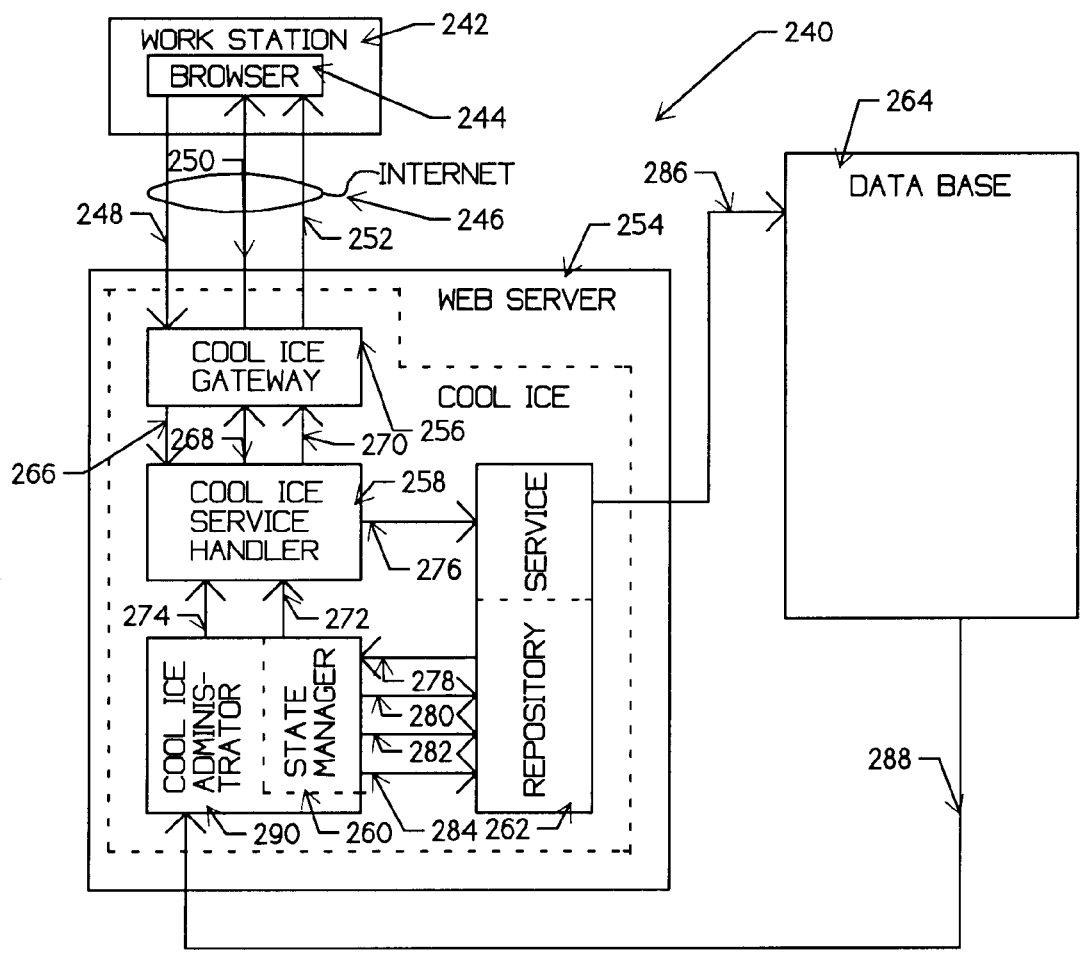
FIG. 9 is a detailed diagram of the storage and utilization of state information within the repository.

FIG. 9 is a schematic diagram 240 of the preferred mode of the present invention showing normal data flow during operation, with special attention to the state saving feature. Work station 242 is an industry compatible personal computer operating under a commonly available operating system such as Windows 95. Browser 244 is a standard, commercially available web browser having frames capability. Path 248 is the normal world wide web path between work station 242 and web server 254 for the transfer of service requests and input data. These transfers are converted by Cool ICE gateway 256 as explained above and sent to Cool ICE service handler 258 via path 266 for disposition.

The service request for data and/or another function is converted into the data base management language by reference to the service definition portion of repository 262 through reference along path 276. The actual command language of the data base management system is utilized over path 286 to access data base 264. The resultant data from data base 264 is transferred to Cool ICE administrator 290 via path 288. State manager 260 determines whether the original service request requires additional queries to data base 264 for completion of the dialog. If yes, the resultant data just received from data base 264 is transferred via path 284 to repository 262 for temporary storage, and the next query is initiated over path 286, and the process is repeated. This is the state saving pathway which is required to provide the user of the Cool ICE system to function in a dialog form over the world wide web.

Upon receipt of the resultant data from the final query of data base 264, state manager 260 determines that the service request is now complete. State manager 260 notifies repository 262 via path 280, and the intermediate products are retrieved from temporary storage in repository 262 via path 278 and supplied to Cool ICE service handler 258 via path 272 for formatting. State manager 260 then clears the intermediate products from temporary storage in repository 262 via path 282. The final response to the service request is sent to Cool ICE gateway 256 via path 270 for translation and to browser 244 via path 250.

Figure 10:
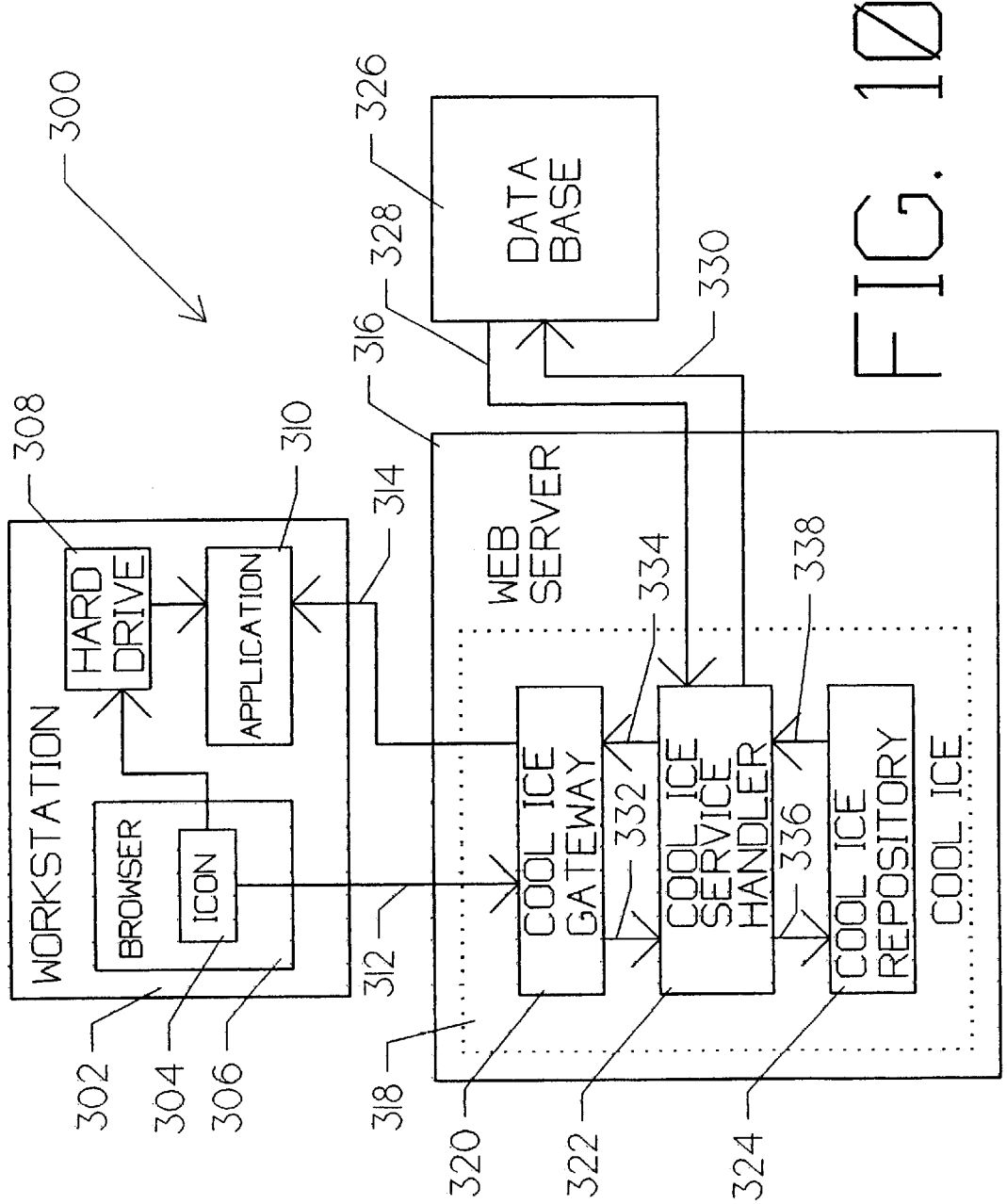
FIG. 10 is a detailed diagram of the use of an icon in accordance with the preferred mode of the present invention.

FIG. 10 is a detailed diagram 300 showing operation of the Cool ICE system using the unique Cool ICE icon feature. Workstation 302 is an internet terminal. In the preferred mode, workstation 302 is an industry compatible, personalized computer running under a current Windows operating system. Browser 306 is a commercially available web browser having frames capability.

Icon 304 is an icon which has been predefined as identifying a particular object located within Cool ICE system 316. When the user of workstation 302 clicks icon 304, an HTML message is transmitted over world wide web path 312 to web server 316. Cool ICE system 318 receives the HTML message at Cool ICE gateway 320 for translation into internal Cool ICE language. The message is transferred via path 332 to Cool ICE service handler 322. A reference is made to Cool ICE repository 324 via path 336 to access the Cool ICE object corresponding to icon 304.

The object corresponding to icon 304 is read from Cool ICE repository 324 and transferred to Cool ICE service handler 322 via path 338. To the extent that this object involves data base management system command language, Cool ICE service handler 322 insures that the commands are executed. To the extent that this object (or the data base management system command language which it defines) requires access to data stored within data base 326, the access request(s) is made over path 330 and the data is provided over path 328.

Following complete execution of all command statements of the object and completion of all required accesses to data base 326, Cool ICE service handler 322 formats a response to the object request and transfers it to Cool ICE gateway 320 via path 334. The response in HTML language is transferred to workstation 302 over world wide web path 314.

The object defined by icon 304 may be a text file, a document, tabular data, or the dynamic results of various calculations within web server 316. In any event in the preferred mode of the present invention, icon 304 also identifies application 310 within workstation 302 which directly corresponds to the defined object. Clicking icon 304 also retrieves application 310 from hard drive 308 for activation. The resultant received from web server 316 is transferred to application 310 for processing within workstation 302. For example, if icon 304 defines a text file, application 310 may be a word processing system; if icon 304 defines a document, application 310 may be a message distribution system, if icon 304 defines tabular data, application 310 may be a spread sheet program; and if icon 304 defines dynamic results of various calculations, application 310 may be a process control program.

Thus, icon 304 defines (and retrieves/activates) data and processes available only from web server 316. However, icon 304 also simultaneously defines (and activates) application 310 within workstation 302. The result is that web server 316 cooperates with workstation 302 to access, combine, and process data in response to clicking a single icon. Also apparent from this description is that the process is inherently iterative. Application 310 can, for example, interact with the object within Cool ICE system 318 defined by icon 304 over world wide web paths 312 and 314, or application 310 can directly request and activate a subsequent object of Cool ICE system 318 via world wide web path 312.

Having thus described the preferred embodiments of the present invention, those of skill in the art will be readily able to adapt the teachings found herein to yet other embodiments within the scope of the claims hereto attached.

I claim:

1. In a data processing environment having a user terminal coupled to a publicly accessible digital communications network and having a data base management system with at least one accessible object coupled to said user terminal via said publicly accessible digital communications network, the improvement comprising:
   a. an icon actuatable from said user terminal to cause said data base management system to access said at least one accessible object;
   b. wherein said user terminal further comprises at least one application actuatable from said icon;
   c. wherein said at least one accessible object transfers data to said at least one application via said publicly accessible digital communications system;
   d. wherein said data base management system further comprises a second object accessible by said at least one application; and
   e. wherein said data base management system is Cool ICE system.

2. A method of communicating between a user terminal having an icon and a data base management system having an accessible object responsively coupled to said user terminal via a publicly accessible digital data network comprising:
   a. transmitting a request from said user terminal to said data base management system in response to actuation of said icon;
   b. accessing said object by said data base management system in response to receipt of said request from said user terminal;
   c. wherein said user terminal includes an application, further comprising executing said application in response to actuation of said icon;
   d. providing data corresponding to said object to said application following said accessing step;
   e. wherein said data base management system includes a second object, further comprising requesting said second object by said application after said providing step in response to receipt of said data; and
   f. wherein said data base management system further comprises Cool ICE data base management system.

3. An apparatus comprising:
   a. a user terminal;
   b. means responsively coupled to said user terminal for providing said user terminal with access to a publicly accessible digital communication network;
   c. means responsively coupled to said publicly accessible digital communication network for offering data base management services;
   d. a manually actuatable icon located within said user terminal;
   e. an accessible object located within said offering means;
   f. means responsively coupled to said icon and said offering means for causing said offering means to access said object in response to actuation of said icon;
   g. wherein said publicly accessible digital communication network further comprises the world wide web;
   h. an application located within said user terminal;
   i. means responsively coupled to said icon and said application for scheduling said application in response to actuation of said icon; and
   j. wherein said offering means further comprises Cool ICE data base management system.

4. An apparatus according to claim 3 wherein said user terminal further comprises an industry standard personal computer.

* * * * *